H. H. CUTLER.
GASOLENE ENGINE.
APPLICATION FILED DEC. 1, 1910.
1,139,106.
Patented May 11, 1915.
5 SHEETS—SHEET 3.
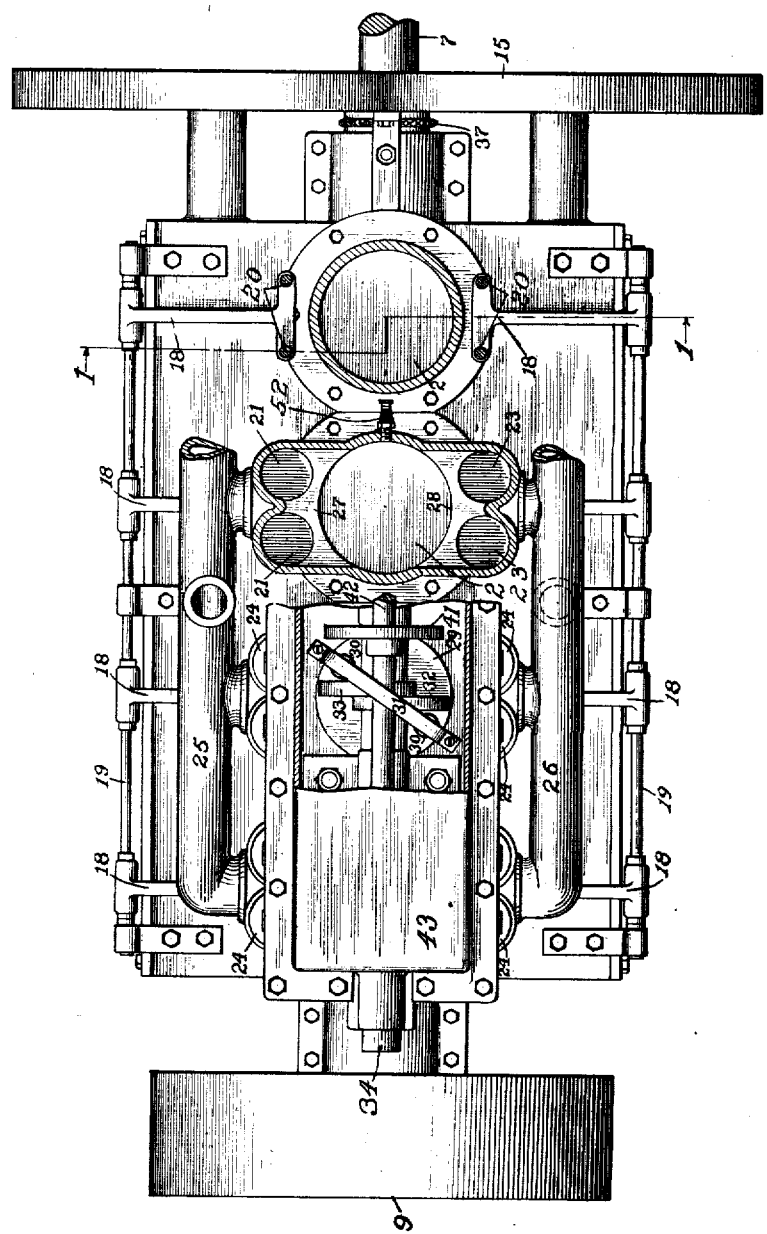

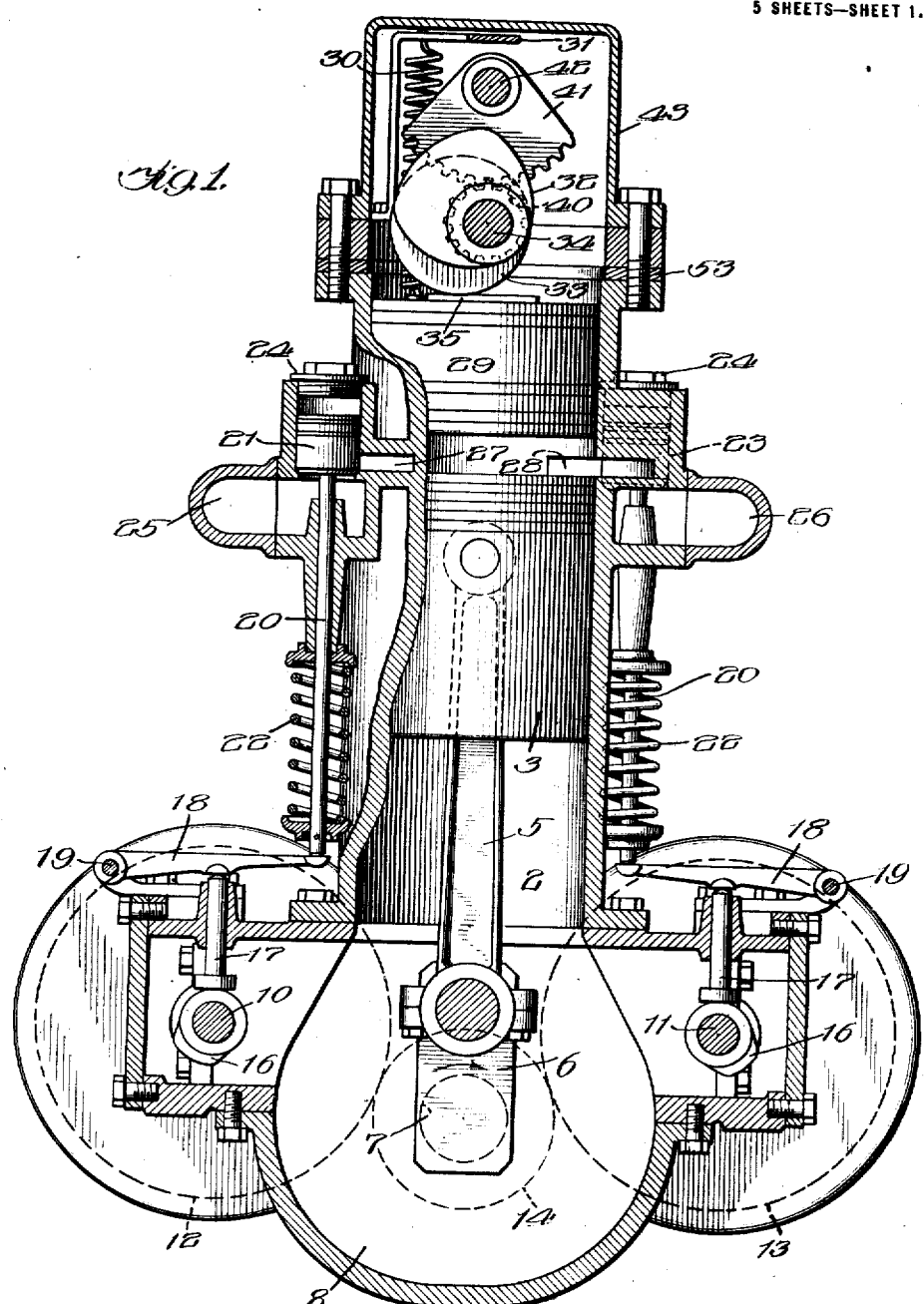

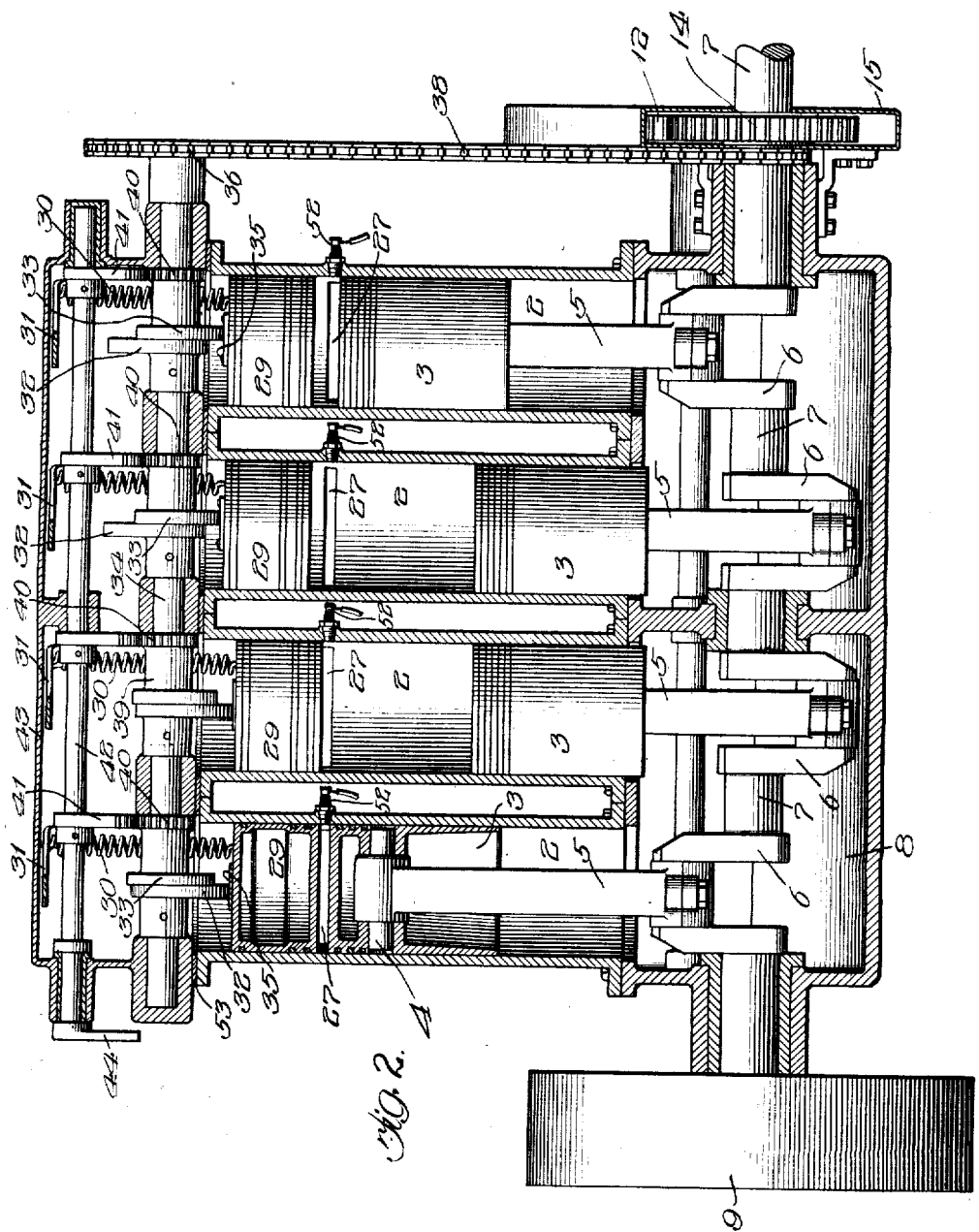

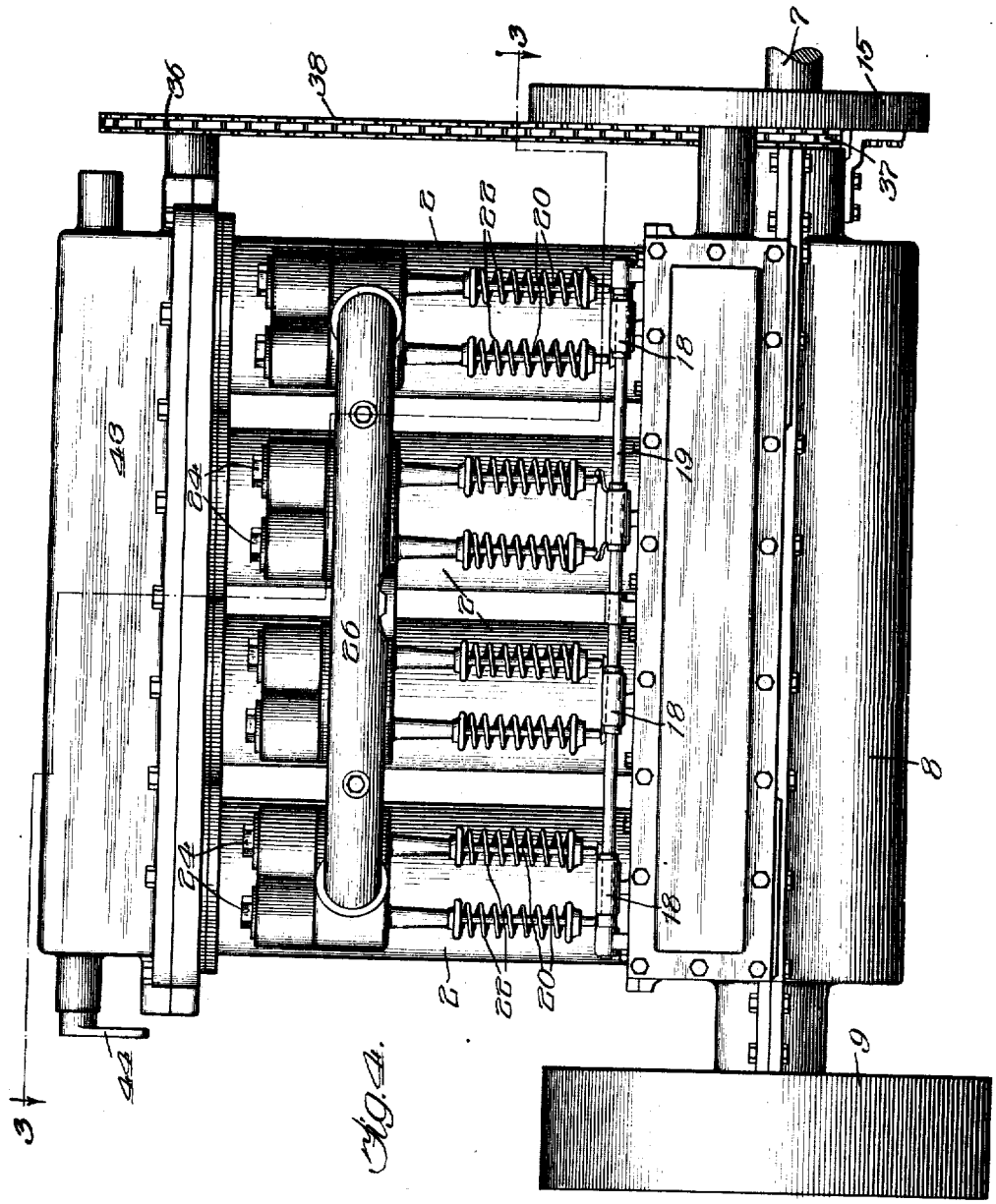

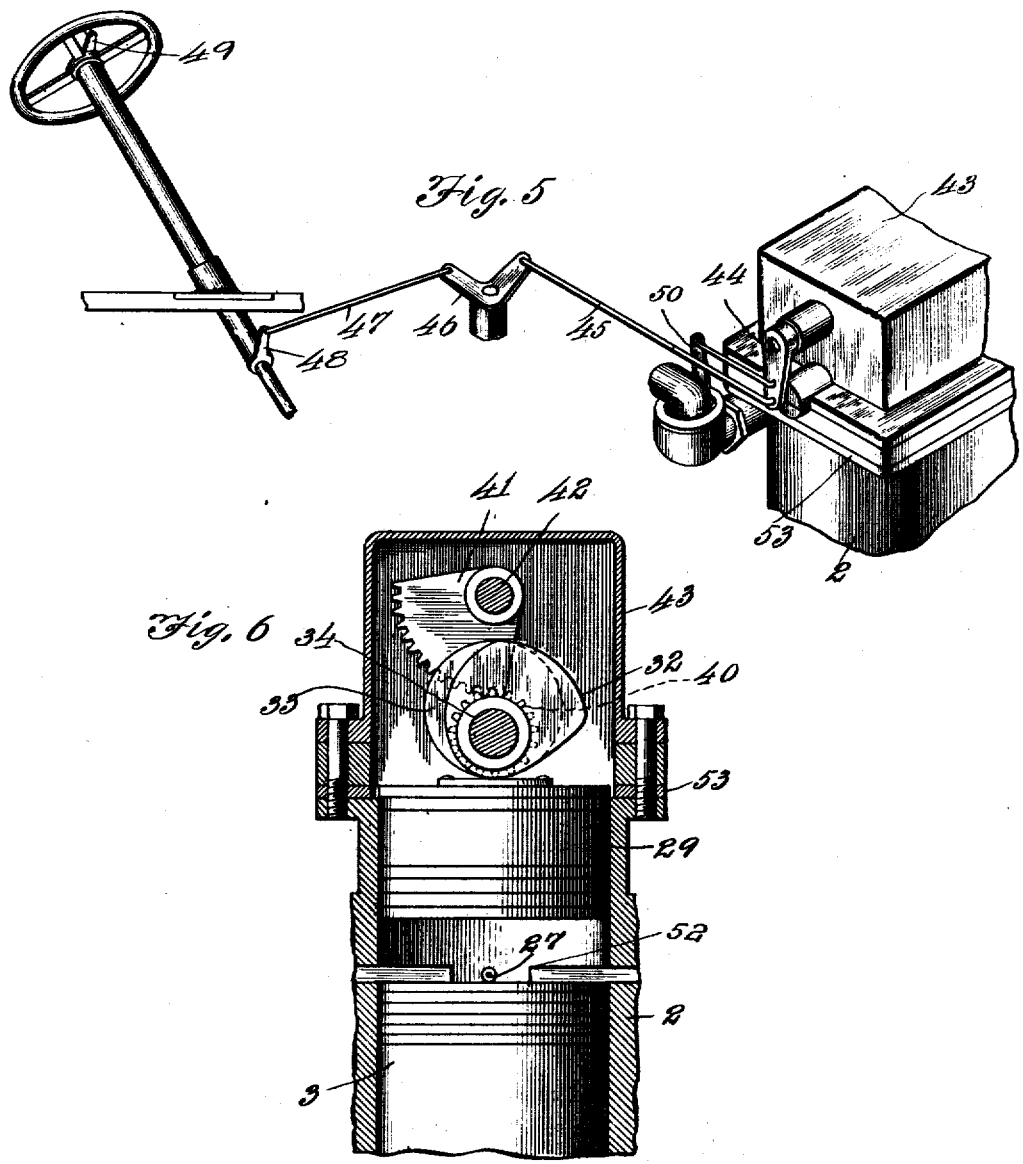

UNITED STATES PATENT OFFICE.

HENRY H. CUTLER, OF MILWAUKEE, WISCONSIN.

GASOLENE-ENGINE.

1,139,106.

Specification of Letters Patent.  Patented May 11, 1915.

Application filed December 1, 1910. Serial No. 595,015.

*To all whom it may concern:*

Be it known that I, HENRY H. CUTLER, a citizen of the United States, residing at Milwaukee, in the county of Milwaukee and State of Wisconsin, have invented new and useful Improvements in Gasolene-Engines, of which the following is a full, clear, concise, and exact description, reference being had to the accompanying drawing, forming part of this specification.

My invention relates to improvements in gasolene or similar engines, its object being to produce a motor or engine of the internal combustion type which is more efficient than those heretofore known and comparatively simple in construction.

In carrying out my invention I make provision for compressing the working mixture for the power stroke to approximately the same pressure before ignition independent of the load upon the engine. That is, the compression of the working mixture is maintained approximately the same for each stroke of the engine whether it is running under a light load or a heavy load. This I accomplish in the particular form of my invention illustrated herein by varying the volume of the compression chamber in accordance with the variation of the load on the motor or engine. In other words, with a light load a smaller volume of the compression chamber is employed and with heavy loads a larger volume is utilized, whereby, under all conditions of loading the working mixture in the compression chamber is compressed to approximately the same pressure before ignition with the result that more complete combustion results throughout in the working of the engine, greater expansion of the gases is secured and a more economical and efficient working of the engine as a whole is effected. When operating at light load the combustion of the gases and consequently the expansion is so complete that the exhaust is below the pressure of the atmosphere, and under all conditions of loading the combustion will be far more complete and positive than in ordinary types of engines, thereby utilizing a large percentage of the heat in useful work which is ordinarily wasted in useless heating of the engine and lost in the exhaust.

Another feature of the present invention is that the engine is self-scavenging, whereby the impure exhaust or inert gases are substantially all discharged from the cylinder at the exhaust stroke.

Other features and advantages will be apparent to those skilled in the art from the description and claims to follow.

In the accompanying drawings, which illustrate one specific form of motor or engine embodying my invention and in which the same reference characters refer to like parts throughout—Figure 1 is a vertical cross sectional view, said section being taken on the line 1—1 of Fig. 6 and looking in the direction of the arrows; Fig. 2 is a vertical sectional view taken centrally through the engine; Fig. 3 is a plan view of the engine, parts being shown in section, the plane of section being indicated by the line 3—3 of Fig. 4; Fig. 4 is a side elevational view of the engine; Fig. 5 is a diagrammatic perspective view showing the manner of varying the volume of the compression chamber at the will of the operator; and Fig. 6 is a detail cross sectional view through one of the cylinders of the engine and showing the position of the parts when the compression chamber is at its maximum volume.

The cylinders 2 of the engine, which is of the four-cycle type, are shown as cast separately and spaced apart for purposes of ventilation, though they may be otherwise constructed and arranged. The reciprocating power pistons 3 are connected by the pins 4 and connecting rods 5 to the cranks 6 suitably disposed in the usual crank shaft 7 which is mounted to rotate in suitable bearings in the crank case 8. A fly wheel 9 is carried at one end of the crank shaft and certain gearing, hereinafter described, at the other end.

The cylinder castings are bolted to the upper side of the crank case, and the lower part of the latter, as well as the outer faces of the projecting side portions are removably bolted in position as indicated more particularly in Fig. 1. The projecting side portions of the crank case or base portion of the engine accommodate the two cam shafts for the valves, the shaft 10 in the arrangement here depicted operating, say, the intake valves on one side of the cylinders and the other shaft 11 operating the exhaust valves on the other side of the cylinders. These two shafts are operated at half the speed of the main shaft 7 through the medium of the gears 12 and 13 on said shafts 10 and 11, respectively, and pinion or gear 14 on crank shaft 7, these gears being inclosed in a case 15 suitably supported from the adjacent end of the crank case.

The shaft 10 is provided with suitably shaped cams 16 designed to raise and lower the vertically sliding pins 17 which in turn raise and lower the valve levers 18 pivoted to a rod or stationary shaft 19 traversing the length of the crank case or base of the engine and supported by brackets from the upper side thereof. The movable ends of said levers 18 engage and serve to raise the valve stems 20 of the intake valves 21. A coil spring 22 working between a cap attached in any suitable way to the lower end of the stem 20 and another attached to the bearing above for said stem exerts a downward pressure on said stem to seat the valve when the lever 18 is lowered. The shaft 11 on the opposite side of the engine is provided with corresponding cams which operate corresponding and similarly constructed elements to which the same reference characters are applied and need no additional description, except for convenience of reference, I have marked the valves, which are the exhaust valves, with the numeral 23.

As shown in Figs. 3 and 4, there are preferably two such valves for both the intake and the exhaust of each cylinder, the casings for these valves being cast integrally as shown particularly in Figs. 1 and 3 with the cylinders, and the valves being preferably of the piston type to reduce as much as possible the clearance around these parts for the waste gases. Screw plugs 24 serve to close the valve cylinders after the valves have been placed in position. Beneath the valve seats suitable passages communicate with the intake pipe 25 on the one side and with the exhaust pipe 26 on the opposite side of the cylinders, said pipes being common to all the cylinders, as indicated in Figs. 3 and 4. The valve chambers communicate by two large ports 27 and 28 with the interior of the cylinders 2, thus providing at the proper times for the free inlet of the working mixture of gases and the free exhaust of the inert or waste gases.

The cylinders 2 are extended some distance beyond the end of the stroke of the main pistons 3 as shown and are provided with auxiliary pistons 29 constituting movable heads for the cylinders and which I term compression pistons. These compression pistons provide both for the variable compression chamber and for scavenging the engine. They are each drawn upwardly by two springs 30 (Figs. 1, 2 and 3) extending between it and an overhead yoke 31, and are limited in their upward movement and depressed at the proper times by two cams 33 and 32, respectively, mounted on the shaft 34, which I call the compression cam shaft, extending along the tops of the cylinders and journaled in bearings in the cover or top casing which is securely bolted to the cylinder castings as indicated in the drawings. Each compression piston is provided with a bearing plate 35 against which the said cams bear.

The cams 32 are fixed to the shaft 34 and are rotated by it at half the speed of the main shaft 7 through the medium of suitably sized sprocket wheels 36 and 37 mounted on said shafts, respectively, and the sprocket chain 38 connecting them.

The cams 32 are so shaped and disposed on said shaft 34 that when the power stroke has been completed and the exhaust port is opened the compression piston is depressed so that when the exhaust stroke is completed the ends of the two pistons are brought close together and practically all the exhaust gases are thereby expelled from the cylinder, the compression cylinder being again moved back to place by the time the compression stroke is completed, thus providing sufficient clearance volume for the compression chamber. This action is illustrated in Fig. 2 in which the first cylinder (reading from left to right) illustrates the end, say, of the exhaust stroke, the main piston having completed its upward exhaust stroke and the compression piston having been moved down to its lowest position by cam 32, thus expelling practically all the waste gases.

The fourth cylinder shows the pistons at the end of the compression stroke, the cam 32 having moved around away from the compression piston 29 and allowed the springs 30 to raise the same, thereby providing sufficient room between the ends of the two cylinders for the compression chamber. In this manner the engine is self scavenging.

In order to compress the working mixture to the same pressure approximately whether the engine is working under heavy or light loads, the cams 33 which limit the upward movement of the compression pistons are carried eccentrically upon the sleeves 39 which are loosely mounted upon the shaft 34, which I term the compression regulating shaft, and are provided at their opposite ends with pinions 40 which intermesh with segmental gears 41 fixed on the shaft 42 mounted in the cover 43 extending over the tops of all the cylinders. This shaft (Fig. 5) is provided with an arm 44 exterior to the top cover which is connected by rod 45 with the elbow lever 46, the latter in turn connected by rod 47 with the arm 48 connected to and operated by the throttle lever 49 on the steering wheel. The arm 44 is shown connected with the lever 50 of the carbureter. As a result of this or any equivalent connection of the parts any movement of the throttle lever to open or close the carb bureter correspondingly varies the position of the cams 33 and thereby varies the volume of the compression chamber in each cylinder. Thus when the throttle or carbureter is thrown wide open the cams 33 are rotated so as to permit the pistons 29 to rise to the highest point as in Fig. 6, thereby giving the compression chamber its maximum volume; and when the throttle is closed to its greatest extent the cams are rotated so as to permit the pistons to rise to the least extent, thereby reducing the compression chamber to its minimum volume. Intermediate positions of the throttle proportionately affect the positions of the pistons and consequently the volume of the compression chamber. The volume of the compression chamber is thus maintained approximately proportional to the amount of the working mixture drawn in at each stroke and the pressure of the same before ignition is approximately the same whether the engine is under heavy or light load. This results in a positive and complete combustion of the working mixture under all conditions. And whatever the volume of the compression chamber, the cylinders are completely emptied of the exhaust gases after each power stroke by the forward movement of the said compression pistons.

A spark plug 52 (Figs. 2 and 3) is placed in each cylinder and connected in any desired way with any suitable source of electricity.

For the purpose of describing briefly the complete operation of the engine it may be assumed that the first cylinder on the left shows the pistons in their respective positions at the end of the exhaust stroke, the second cylinder their positions at the end of the intake stroke, the third cylinder their positions at the end of the power stroke and the fourth cylinder their positions at the end of the compression stroke. From the first cylinder it will be noted that the exhaust gases have been substantially all expelled. In the second cylinder the charge of the working mixture has been drawn into the cylinder, in the fourth cylinder the working mixture has been compressed to the volume corresponding to the position of the regulating cams 33 and in the third cylinder the same has been exploded and the stroke completed.

As indicated in Fig. 1 the intake valves 21 and the exhaust valves 23 are timely operated by the cams 16 on the shafts 10 and 11 to open and close said valves at the proper time for the respective cylinders, said cams being suitably shaped and located on their shafts to accomplish the results, all of which is well understood by persons skilled in the art. Owing to the location and construction of these valves there is practically no lost clearance space for the waste gases so that when the two pistons are brought together at the end of the exhaust stroke the exhaust gases are practically all expelled. The construction of these parts being the same either set of valves may be made the intake or the exhaust valves by suitably timing their operation.

By allowing the head of the piston 3 to approach very close to the movable head or piston 29 there is a tendency to produce a partial vacuum when the piston 3 starts on the suction stroke and before the inlet valves open, this causing a rush of the combustible material into the cylinder when such valves do open. This could not be effected in this way in case of a large clearance in the combustion chamber.

Should the engine be working under a heavy load the carbureter is thrown open by the operator or by the driver in case the engine is applied to an automobile, boat or other vehicle, as indicated in Fig. 5, thereby increasing the volume of the compression chamber. On the other hand, if the engine is working under a light load the operator closes his throttle to cause the carbureter to admit a less amount of the working mixture and the volume of the compression chamber in the cylinders is reduced. So at all times the volume of the compression chamber corresponds to the amount of the mixture taken in and its pressure just before ignition is substantially the same. Under these conditions, as heretofore explained, the most efficient combustion and expansion of the gases are secured.

The upper ends of the cylinders are secured in position by means of a strong plate 53 extending over the tops of all of the cylinders and which is rigidly and independently bolted or otherwise suitably secured thereto. The compression cam shaft 34 is a comparatively heavy shaft and firmly supported in its several bearings since it must withstand the thrust from the compression pistons 29 due to the explosions in the cylinders. The cover itself may be of lighter material and, as is indicated in the drawings, may be removed by taking out the bolts at the side to enable the parts to be assembled and inspected at any time. Any suitable means may be provided for oiling the various parts of the engine. The compression pistons 29 are cast hollow, as indicated in Fig. 2, suitable provisions (not shown) being made for removing the cores therefrom. All of the pistons, as well as the valves, are provided with cast iron packing rings of the usual construction or of any desired type, so that the pistons and valves will make tight fits. Cooling ribs may be applied to the cylinders if desired.

Although I have shown four cylinders it will be obvious that the several features of my invention may be applied to engines of greater or less number of cylinders, and although I have shown the compression pistons to be under the control of the operator, it is obvious that the same may be automatically controlled by a suitable governor from the engine itself, whereby when the load changes the volume of the compression chamber will be automatically and correspondingly changed.

While I have described one embodiment of my invention, it is obvious that various changes may be made therein without departing from the spirit of the invention and without exceeding the scope of the appended claims.

Having thus described my invention, what I claim as new and desire to secure by Letters Patent of the United States, is—

1. In an internal combustion engine, the combination with a cylinder forming the combustion chamber, of a working piston therein, a movable member in the opposite end of the cylinder, means for timely advancing the said member to expel the exhaust gases from the cylinder, and means to variably limit its position of return to thereby vary the volume of the compression chamber between said member and piston.

2. In an internal combustion engine, the combination with a cylinder, of a working piston operable in one end of said cylinder, a compression piston in the opposite end of said cylinder, means operated by the engine for advancing said compression piston at each exhaust stroke to expel the exhaust gases, and means for varying the position of return of said compression piston to thereby vary the volume of the compression space between said two pistons.

3. In an internal combustion engine, the combination with a cylinder, of a working piston therein, a compression piston, the combustion chamber being between said pistons, means for advancing the compression piston to expel the exhaust gases at each exhaust stroke, and an adjustable stop device to limit the return position of said compression piston to thereby vary the volume of the compression space.

4. In an internal combustion engine, the combination with a cylinder, of a working piston therein, a compression member, a cam in the rear of said compression member operated by the engine and timed to advance the same at each exhaust stroke to expel the exhaust gases, and a second cam in the rear of said compression member to limit its return position to thereby vary the compression space, said second cam being operated independently of the first named cam.

5. In an internal combustion engine, a cylinder, a working piston therein, a compression member between which and the working piston a combustion chamber is formed, a shaft in the rear of the compression member, a cam fixed thereon, said shaft being operated to cause the cam to advance the compression member at each exhaust stroke, a second cam loosely mounted on said shaft and arranged to limit the return position of the compression member to vary the volume of the compression space, and mechanism under the control of the operator for changing the position of said loosely mounted cam.

6. In an internal combustion engine, a cylinder, a working piston therein, a compression piston therefor, and means to advance said compression piston at each exhaust stroke and to positively vary its position of return to thereby regulate the volume of the compression chamber.

7. In an internal combustion engine, a plurality of cylinders, power pistons therein, compression pistons opposed to the power pistons, cams adjacent the compression piston, two for each cylinder, one of said cams being timed and operated by the engine to advance the compression cylinder at each exhaust stroke of the main piston, and the other of said cams being operated to vary the return position of the compression piston according to the load imposed on the engine.

8. In an internal combustion engine, a plurality of cylinders side by side in a row, power pistons therein suitably connected with the crank shaft adjacent one end of the cylinders, compression pistons opposite the power pistons, a compression cam shaft adjacent the compression pistons, cams on said latter shaft, some of said cams being operated to advance said compression pistons to scavenge the cylinders, and the others being operated to vary the return position of said compression cylinders to thereby vary the volume of the compression chamber.

9. In an internal combustion engine, the combination with a cylinder, of a working piston therein, a movable member connected with said cylinder, a compression chamber including the space between said piston and member, and means operated by the engine for moving said member to scavenge the cylinder after each explosion, and means under the control of the operator to vary the position of return of said member to thereby vary the volume of the compression chamber.

10. In a vehicle, the combination with an explosive engine for driving the vehicle at various speeds and under varying conditions of load, of means operable from the driven position and under control of the driver of the vehicle at all times for varying the amount of explosive mixture supplied to the engine, and means for automatically varying the compression space of the engine in accordance with the amount of explosive mixture supplied to the engine.

11. In a vehicle, the combination with a steering wheel, of a variable speed explosive engine mounted on the vehicle and adapted to furnish the driving power therefor, said engine being controlled from the steering wheel, and means mounted on the steering wheel or column to enable the operator to vary the amount of mixture supplied to the engine and to correspondingly vary the volume of the compression chamber of the engine.

In witness whereof, I have hereunto subscribed my name in the presence of two witnesses.

HENRY H. CUTLER.

Witnesses:
F. S. WILHOIT,
C. T. HENDERSON.

It is hereby certified that in Letters Patent No. 1,139,106, granted May 11, 1915, upon the application of Henry H. Cutler, of Milwaukee, Wisconsin, for an improvement in "Gasolene-Engines," an error appears in the printed specification requiring correction as follows: Page 4, line 123, for the word "driven" read *driver's;* and that the said Letters Patent should be read with this correction therein that the same may conform to the record of the case in the Patent Office.

Signed and sealed this 25th day of May, A. D., 1915.

[SEAL.]

R. F. WHITEHEAD,
*Acting Commissioner of Patents.*